(12) United States Patent
Yoon et al.

(10) Patent No.: US 9,128,314 B2
(45) Date of Patent: Sep. 8, 2015

(54) DISPLAY APPARATUS AND METHOD FOR MANUFACTURING THE SAME

(75) Inventors: Sunghwan Yoon, Seoul (KR); HakMo Hwang, Goyang-si (KR); InJue Kim, Paju-si (KR); Kyungjae Park, Paju-si (KR); YongJoong Yoon, Paju-si (KR); In-Han Ga, Anseong-si (KR)

(73) Assignee: LG DISPLAY CO., LTD., Seoul (KR)

( * ) Notice: Subject to any disclaimer, the term of this patent is extended or adjusted under 35 U.S.C. 154(b) by 447 days.

(21) Appl. No.: 13/333,503

(22) Filed: Dec. 21, 2011

(65) Prior Publication Data

US 2012/0268868 A1   Oct. 25, 2012

(30) Foreign Application Priority Data

Apr. 22, 2011   (KR) .................. 10-2011-0038003

(51) Int. Cl.
*H05K 5/00* (2006.01)
*G02F 1/1333* (2006.01)

(52) U.S. Cl.
CPC .......... *G02F 1/133308* (2013.01); *G02F 2001/133311* (2013.01); *Y10T 29/49826* (2015.01)

(58) Field of Classification Search
CPC ............ G02F 1/133308; G02F 2201/465; G06F 1/1626; H04M 1/0266
USPC .............. 349/58, 60; 361/679.21, 679.24
See application file for complete search history.

(56) References Cited

U.S. PATENT DOCUMENTS

| 6,654,078 | B1 * | 11/2003 | Kato et al. ................. 349/58 |
| 6,909,475 | B2 * | 6/2005 | Kojima et al. ............... 349/58 |
| 2002/0015118 | A1 * | 2/2002 | Kashimoto ................. 349/58 |
| 2003/0020679 | A1 | 1/2003 | Kojima et al. |
| 2004/0090567 | A1 | 5/2004 | Lee et al. |
| 2004/0119907 | A1 | 6/2004 | Ahn |
| 2004/0141102 | A1 * | 7/2004 | Lin ........................... 349/58 |
| 2007/0241991 | A1 * | 10/2007 | Tsai ............................ 345/7 |
| 2008/0151138 | A1 * | 6/2008 | Tanaka ...................... 349/58 |
| 2008/0278895 | A1 | 11/2008 | Woo |
| 2009/0231509 | A1 | 9/2009 | Hsu et al. |

FOREIGN PATENT DOCUMENTS

| CN | 1301432 C | 2/2007 |
| CN | 101206317 A | 6/2008 |
| CN | 101533164 A | 9/2009 |
| EP | 1491940 A1 | 12/2004 |

OTHER PUBLICATIONS

Office Action issued in corresponding Chinese Patent Application No. 201110421488.1, mailed Apr. 14, 2014, 14 pages.

\* cited by examiner

*Primary Examiner* — Hung S Bui
*Assistant Examiner* — James Wu
(74) *Attorney, Agent, or Firm* — Brinks Gilson & Lione

(57) ABSTRACT

Disclosed are a display device and a manufacturing method thereof, which do not use some of cases and set covers necessary for producing the display device and thus can minimize a thickness and enhance a sense of beauty with an innovative design. The display device includes a display panel, a guide frame, an adhesive member, a set cover, and a soft member. The set cover receives the guide frame, and surrounds a side of the display panel. The soft member is formed at the set cover, and closely contacted to the side of the display panel.

8 Claims, 10 Drawing Sheets

DISPLAY APPARATUS AND METHOD FOR MANUFACTURING THE SAME

Pursuant to 35 U.S.C. §119(a), this application claims the benefit of earlier filing date and right of priority to Korean Application 10-2011-0038003 filed on Apr. 22, 2011, the content of which is incorporated by reference herein in its entirety.

BACKGROUND

1. Field of the Invention

The present disclosure relates to a display device, and more particularly, to a display device and a manufacturing method thereof, which minimize a thickness and enhance a sense of beauty with an innovative design.

2. Discussion of the Related Art

Recently, flat panel display devices that can decrease a weight and a volume corresponding to the limitations of Cathode Ray Tubes (CRTs) are being developed. Liquid Crystal Display (LCD) devices, Plasma Display Panels (PDPs), Field Emission Display (FED) devices, and light emitting display devices are actively being researched as flat type display devices. However, among such flat panel display devices, LCD devices are easily manufactured, have good drivability of drivers, realize a high-quality image, and thus are attracting much attention.

In terms of technology and design interesting to consumers, recently, research and development of flat panel display devices are increasingly required. Therefore, efforts are being continuously made for minimizing (slimming) the thicknesses of display devices, and research is increasingly conducted on a design with enhanced sense of beauty that can induce consumers to buy by appealing to the consumers' sense of beauty.

However, in design development for enhancing a scene of beauty or slimming of display devices that have been made to date, elements configuring a related art display device have been applied as is, and the structures of the elements have been changed. Due to these reasons, there are limitations in slimming display devices and developing the new designs of the display devices.

For example, in LCD devices of the related art, a lower case and a front case are necessarily used for receiving a liquid crystal display panel and a backlight unit, and moreover, a separate front set cover and rear set cover are additionally used for applying the LCD devices to notebook computers, monitors, mobile devices, televisions, etc. As described above, display devices of the related art necessarily use the front set cover and rear set cover as well as the lower case and front case, and consequently, there are limitations in reducing the thicknesses of LCD devices or changing the designs thereof. Particularly, the front set cover and rear set cover necessarily cover a top edge of a liquid crystal display panel. Due to this reason, the thicknesses of display devices inevitably become thicker, and moreover, the border widths of the display devices enlarge. In addition, it is difficult to realize various innovative designs due to a step height in a border portion.

BRIEF SUMMARY

A display device includes: a display panel; a guide frame supporting a bottom edge portion of the display panel; an adhesive member coupling the display panel and the guide frame; a set cover receiving the guide frame, and surrounding a side of the display panel; and a soft member formed at the set cover, and closely contacted to In another aspect of the present invention, there is provided a display device including: a display panel; and a supporting member surrounding portions other than a top of the display panel, wherein the supporting member includes a set cover closely surrounding a side of the display panel.

In another aspect of the present invention, there is provided a method of manufacturing a display device including: disposing a top of the display panel on a stage; coupling a guide frame to a bottom edge portion of the display panel with an adhesive member; and coupling a set cover to the guide frame to place the guide frame in a receiving space and surround a side of the display panel, the set cover comprising the receiving space and a soft member, wherein the soft member is integrated with the set cover, and closely contacted to the side of the display panel.

In another aspect of the present invention, there is provided a method of manufacturing a display device including: disposing a top of the display panel on a stage; coupling a guide frame with an adhesive member formed therein to a bottom edge portion of the display panel; and surrounding portions other than the top of the display panel and a side of the guide frame, with a set cover coupled to the guide frame, wherein in assembling the guide frame and the set cover, the set cover is elasticized by contact of the guide frame to be coupled to the guide frame.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE DRAWINGS AND THE PRESENTLY PREFERRED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a display device and a manufacturing method thereof according to embodiments of the present invention will be described with reference to the accompanying drawings.

Figure 1:
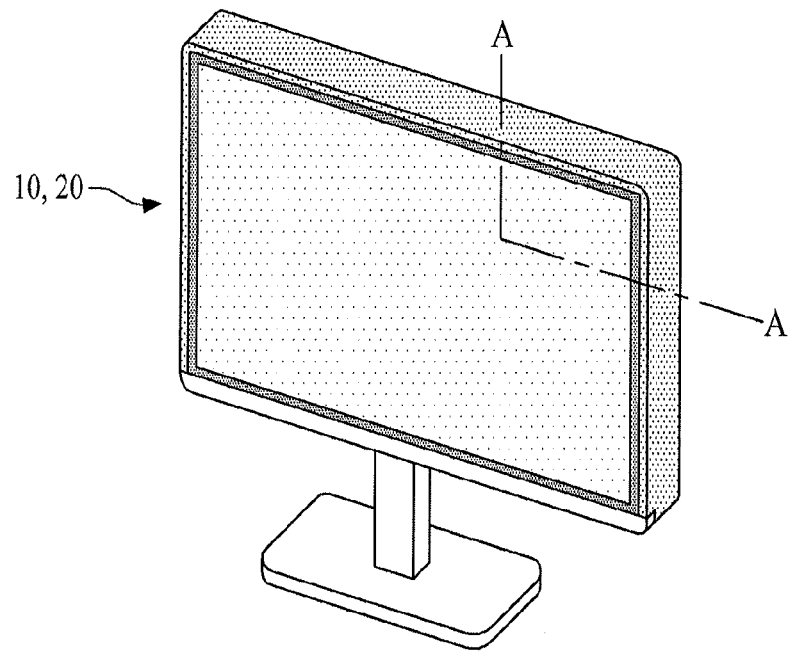
FIG. 1 is a view illustrating a display device according to a first embodiment of the present invention.
Figure 2:
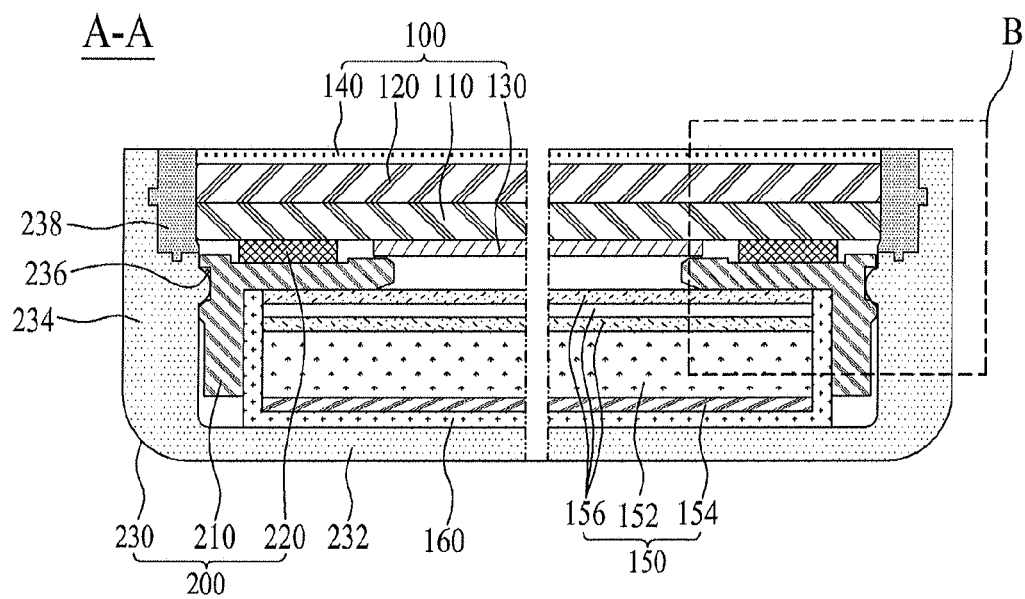
FIG. 2 is a sectional view illustrating a sectional surface taken along line A-A of FIG. 1.
Figure 3:
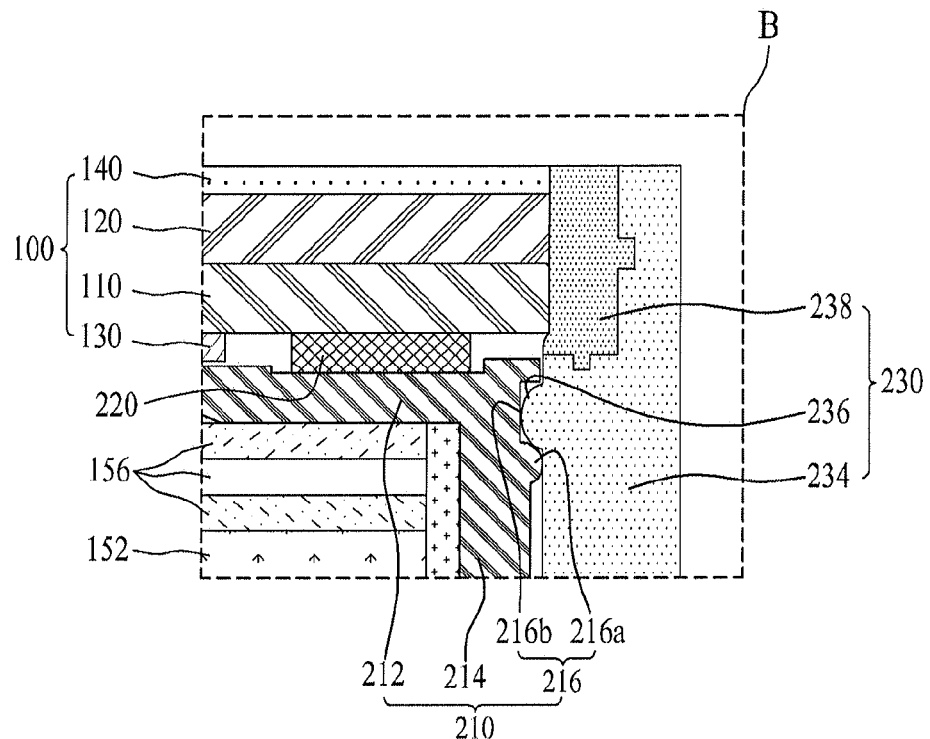
FIG. 3 is an enlarged view illustrating an enlarged portion B of FIG. 2.

FIG. 1 is a view illustrating a display device according to the first embodiment of the present invention. FIG. 2 is a sectional view illustrating a sectional surface taken along line A-A of FIG. 1. FIG. 3 is an enlarged view illustrating an enlarged portion B of FIG. 2.

Referring to FIGS. 1 to 3, a display device 10 according to a first embodiment of the present invention includes a display panel 100, and a supporting member 200 that includes a set cover 230 closely surrounding a side of the display panel 100 and surrounds portions other than a top of the display panel 100.

The display panel 100 may be a liquid crystal display panel or organic light emitting display panel that includes a lower substrate 110 and an upper substrate 120 which are facing-coupled with each other.

When a display panel 100 according to an embodiment is a liquid crystal display panel including a liquid crystal layer (not shown), the display panel 100 includes the lower substrate 110 and upper substrate 120 that are facing-coupled with each other with the liquid crystal layer therebetween, a lower polarizing film 130 adhered to the lower substrate 110, and an upper polarizing film 140 adhered to entire one surface of the upper substrate 120. Herein, detailed structures of the lower substrate 110 and upper substrate 120 may be formed variously according to a driving mode of the liquid crystal layer, for example, a Twisted Nematic (TN) mode, a Vertical Alignment (VA) mode, an In-Plane switching (IPS) mode, or a Fringe Field Switching (FFS) mode.

When a display panel 100 according to another embodiment is an organic light emitting display panel including a plurality of organic light emitting elements (not shown), the display panel 100 includes the lower substrate 110 and upper substrate 120 that are facing-coupled with each other, and depending on the case, the display panel 100 may further include the upper polarizing film 140 adhered to entire one surface of the upper substrate 120. Herein, the organic light emitting elements may be adhered to the lower substrate 110 or upper substrate 120.

The display panel 100 further includes a plurality of circuit films (not shown) adhered to the lower substrate 110, and a Printed Circuit Board (PCB, not shown) adhered to the circuit films. Herein, the circuit films may be adhered to the lower substrate 110 and PCB by a Tape Automated Bonding (TAB) process, and may be a Tape Carrier Package (TCP) or Chip On Flexible Board/Chip On Film (COF). The PCB is electrically connected to the circuit films and supplies various signals for displaying an image on the display panel 100. A timing controller (not shown) for controlling driving of the display panel 100, various power source circuits (not shown), a memory element (not shown), etc. are mounted on the PCB.

When the display panel 100 is a liquid crystal display panel, the display device 10 according to the first embodiment further includes a backlight unit 150 that is disposed at a bottom of the display panel 100 and irradiates light on the display panel 100, and a supporting case 160 that is placed in the set cover 230 and supports the backlight unit 150.

The backlight unit 150 includes a light guide panel 152, a reflective sheet 154, and a plurality of optical sheets 156.

The light guide panel 152 is formed in a flat type (or a wedge type) and guides light, inputted from a light source (not shown) through a light incident surface, to the display panel 100. Herein, the light source may include a fluorescent lamp or a Light Emitting Diode (LED).

The reflective sheet 154 is disposed at a bottom of the light guide panel 152 and reflects light, inputted from the light guide panel 152, to the display panel 100.

The optical sheets 156 are disposed on the light guide panel 152 and enhance the luminance characteristic of light traveling from the light guide panel 152 to the display panel 100. For this end, the optical sheets 156 may include at least one diffusive sheet and at least one prism sheet, or include at least one composite sheet that simultaneously performs a diffusing function and a light collecting function.

Figure 4:
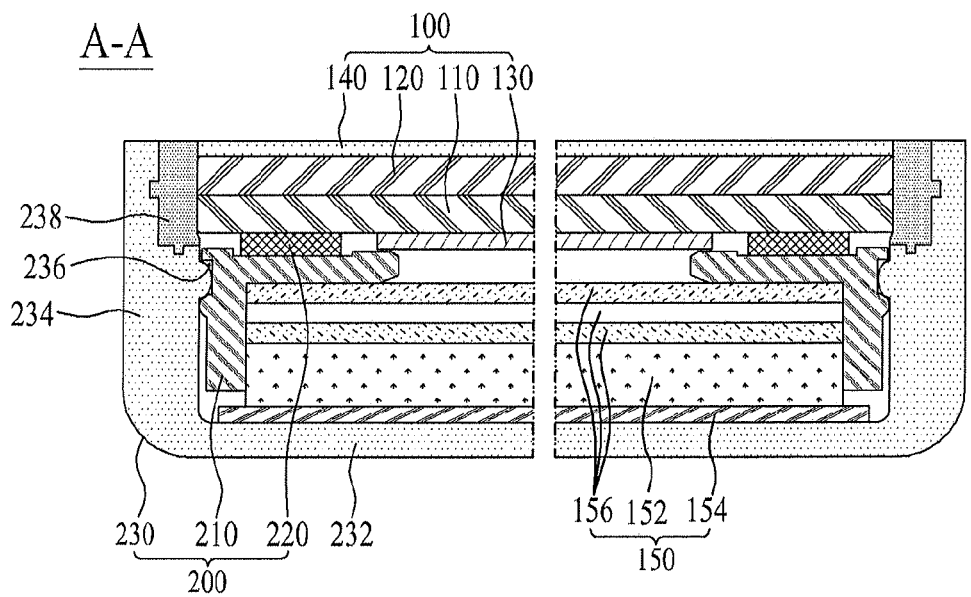
FIG. 4 is a view illustrating a modification embodiment of the display device according to the first embodiment of the present invention.

The supporting case 160 is placed in the set cover 230 and supports the backlight unit 150. For this end, the supporting case 160 includes a supporting plate that supports the backlight unit 150, and a supporting side wall that is bent vertically from an edge of the supporting plate. Herein, the supporting case 160 may be coupled to the set cover 230 by a plurality of screws (not shown). The supporting case 160 may be formed of a metal material and dissipate heat, generated from the backlight unit 150, to the set cover 230. The supporting case 160, as illustrated in FIG. 4, may be removed according to the design and/or slimming of the display device 10. Herein, the backlight unit 150 is directly placed in the set cover 230.

The supporting member 200 is disposed to surround portions other than the top of the display panel 100 to form a side frame of the display panel 100. For this end, the supporting member 200 includes a guide frame 210, an adhesive member 220, and a set cover 230.

The guide frame 210 is formed in a tetragonal frame shape to have a ]-shaped sectional surface, and placed in the set cover 230. The guide frame 210 is coupled to the set cover 230 and supports a rear edge portion of the display panel 100. For this end, the guide frame 210 includes a panel supporting part 212, a guide side wall 214 that is bent vertically from the panel supporting part 212 and coupled to the set cover 230, and a first coupling part 216 that is formed at the guide side wall 214 and coupled to the set cover 230.

The panel supporting part 212 is formed in a plate shape to face a bottom edge portion of the display panel 100. An adhesive member having a certain depth for facilitating the formation of the adhesive member 220 may be formed at a top of the panel supporting part 212. When the display device 10 includes the supporting case 160, the panel supporting part 212 is supported by a supporting side wall of the above-described supporting case 160.

The guide side wall 214 is bent vertically from the panel supporting part 212 to face the set cover 230. In this case, when the display device 10 includes the above-described supporting case 160, the guide side wall 214 is disposed between a supporting side wall of the supporting case 160 and the set cover 230.

The first coupling part 216 includes a protruding portion 216a that protrudes from the guide side wall 214, and a groove portion 216b that is formed concavely from the guide side wall 214 to contact the protruding portion 216a.

The protruding portion 216a protrudes by a certain depth from an outer wall of the guide side wall 214 to include at least one of an inclined surface, a curved surface, and a rectangular surface.

The groove portion 216b is formed to a certain depth from the guide side wall 214 to contact the protruding portion 216a. For example, the groove portion 216b may be formed concavely to have a tetragonal sectional shape. In this case, a boundary portion between the protruding portion 216a and the groove portion 216b may be a rectangular surface.

The adhesive member 220 is formed on the panel supporting part 212 of the guide frame 210 and couples the display panel 100 and the guide frame 210. In this case, a bottom of the adhesive member 220 is coupled to an adhesive member forming part that is formed at the panel supporting part 212, and a top of the adhesive member 220 is coupled to a rear edge of the display panel 100. Herein, the top of the adhesive member 220 may be coupled to the lower substrate 110 of the display panel 100, or coupled to the lower polarizing film 130 of the display panel 110. The adhesive member 220 may be a double-sided tape or an adhesive (for example, a glue, an instant adhesive, a thermosetting adhesive, or a photocurable adhesive).

The set cover 230 is formed in a U-shape to have a receiving space, surrounds the side of the display panel 100, and surrounds the portions other than the top of the display panel 100, thereby acting as a product cover of the display device 10. For this end, the set cover 230 includes a set plate 232, a set side wall 234, a second coupling part 236, and a soft member 238.

The set plate 232 acts as a bottom product cover of the display device 10 that is produced in a flat type.

The set side wall 234 is bent vertically from an edge portion of the set plate 232 to form a receiving space. The set side wall 234 is formed to surround the side of the guide frame 210 and acts as a side product cover of a produced display device.

The set side wall 234 is bent vertically from the set plate 232 in order for a height difference not to occur between the set side wall 234 and the top of the display panel 100, and thus has a certain elastic force. Therefore, the set side wall 234 surrounds the side of the display panel 100 with a certain elastic force based on a height and thus forms a side frame portion of the display panel 100.

The second coupling part 236 is formed at the set side wall 234 and coupled to the first coupling part 216 of the guide frame 210 by the elastic force of the set side wall 234. That is, the second coupling part 236 may be a coupling protrusion that protrudes to a certain height from an inner wall of the set side wall 234 corresponding to the groove portion 216b of the first coupling part 216. For example, the coupling protrusion may protrude in a hemispheric shape, but the embodiment is not limited thereto. To couple the guide frame 210 and the set cover 230, the coupling protrusion may have a structure where the coupling protrusion is easily inserted into the groove portion 216b of the first coupling part 216 but not easily detached from the groove portion 216b.

In assembling the guide frame 210 and the set cover 230, the second coupling part 236 contacts the guide side wall 214 of the guide frame 210 or the protruding portion 216a of the first coupling part 216 to elasticize the set side wall 234. Also, the second coupling part 236 is inserted into and coupled to the groove portion 216b of the first coupling part 216 by the elasticity of the set side wall 234.

The soft member 238 is formed along an inner energy portion of the set side wall 234 facing the side of the display panel 100. The soft member 238 is formed of a material such as rubber, urethane, elastomer, or silicon, and integrated with the set side wall 234. For this end, the soft member 238 is simultaneously formed together with the set cover 230, in a double injection process or an insert injection process.

The soft member 238 is pressed against the side of the display panel 110 by the elastic force of the set side wall 234 and thus closely surrounds the side of the display panel 100. That is, in assembling the guide frame 210 and the set cover 230, the set side wall 234 is bent to the outside (in a direction deviating from the guide side wall 214) by the height (or thickness) of the protruding portion 216a of the first coupling part 216 and the height (or thickness) of the second coupling part 236 through contact of the protruding portion 216a and second coupling part 236. Also, when the second coupling part 236 is inserted into the groove portion 216b of the first coupling part 216 by the elastic force of the set side wall 234, as the soft member 238 is bent to the inside (in a direction approaching the guide side wall 214) by the self elastic force of the set side wall 234, the soft member 238 contacts the side of the display panel 100 and moreover is pressed against the side of the display panel 100 in proportion to the elastic force of the set side wall 234.

In the display device 10 according to the first embodiment, in order to closely surround the side of the display panel 100 with the soft member 230, the soft member 230 is formed to overlap with the display panel 100.

Figure 5:
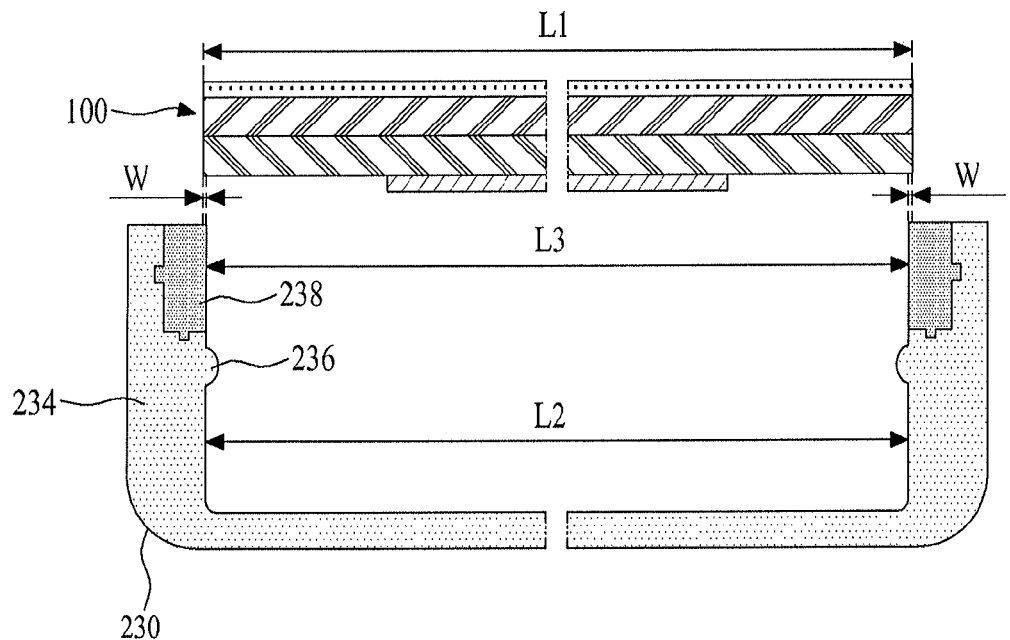
FIGS. 5 and 6 are views for describing overlap of a display panel and soft member, in the display device according to the first embodiment of the present invention.

In an embodiment, as illustrated in FIG. 5, a length L1 of the display panel 100 is formed longer by a certain width (W=L1−L2) than a distance L2 (corresponding to the length L1 of the display panel 100) between the set side walls 234, and thus, the display panel 100 and the soft member 238 overlap with each other by the certain width W. In this case, a distance L3 between the soft members 238 is the same as the distance L2 between the set side walls 234.

Figure 6:
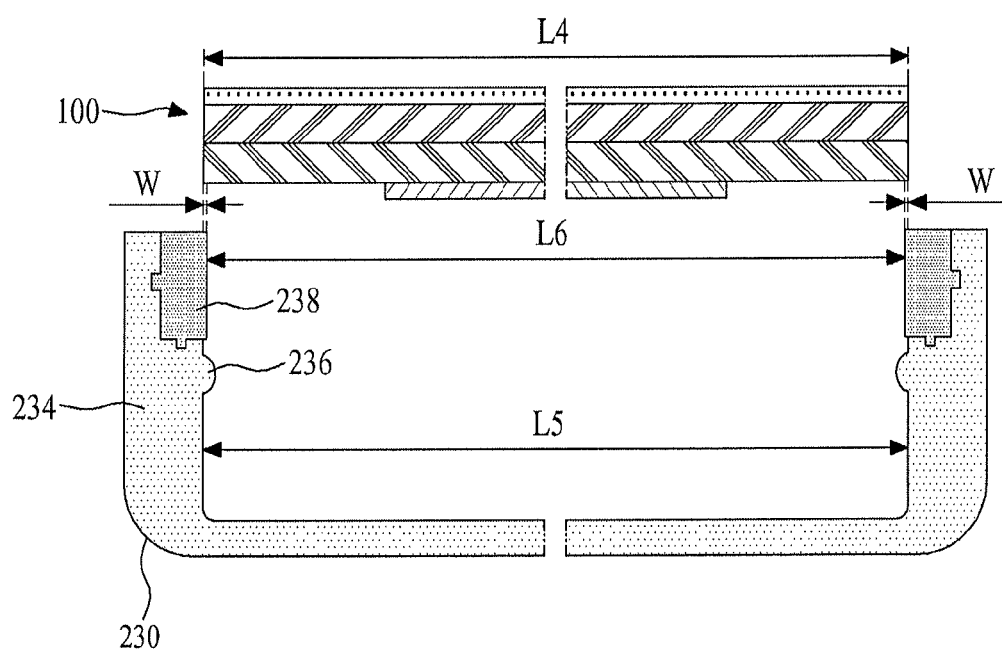

In another embodiment, as illustrated in FIG. 6, a length L4 of the display panel 100 is formed identically to a distance L5 (corresponding to the length L4 of the display panel 100) between the set side walls 234, but a distance L6 between the soft members 238 is formed shorter by a certain width (W=L4−L6) than the length L4 of the display panel 100. Therefore, the display panel 100 and the soft member 238 overlap with each other by the certain width W. In other words, the side of the soft member 238 facing the side of the display panel 100 protrudes to the inside by the certain width W. In this case, the length L4 of the display panel 100 is the same as the distance L5 between the set side walls 234.

As described above, when the soft member 238 overlaps with the display panel 100, the display panel 100 and the set cover 230 cannot be assembled. In assembling the guide frame 210 and the set cover 230, however, in the display device 10 according to the first embodiment, as described above, the display panel 100 and the set cover 230 are easily assembled by elasticity of the set side wall 234 that is bent by the certain width W or greater through contact of the first and second coupling parts 216 and 238 and then returns to an original position, and the soft member 238 may closely surround the side of the display panel 100. In other words, in assembling the guide frame 210 and the set cover 230, the set side wall 234 is elasticized by contact of the protruding portion 216a and second coupling part 236, thereby allowing the soft member 238 to be closely contacted to the side of the display panel 100 and allowing the second coupling part 236 to be inserted into the groove portion 216b.

In the display panel 10 according to the first embodiment, the set cover 230 surrounds the portions other than the top of the display panel 100, and thus, a front case and a front set cover are not applied to general display products. Accordingly, the thicknesses of display devices can be reduced, and a sense of beauty can be enhanced by an innovative design. Also, in the display device 10 according to the first embodiment, by closely adhering the soft member 238 (which is integrated with the set side wall 234 of the set cover 230) to the side of the display panel 100, a front case and a front set cover are removed from general display products, and thus, foreign substances are prevented from being penetrated through a gap that is formed at the side of the display panel 100, thereby preventing the aesthetic design effect from being degraded by the gap.

Figure 7:
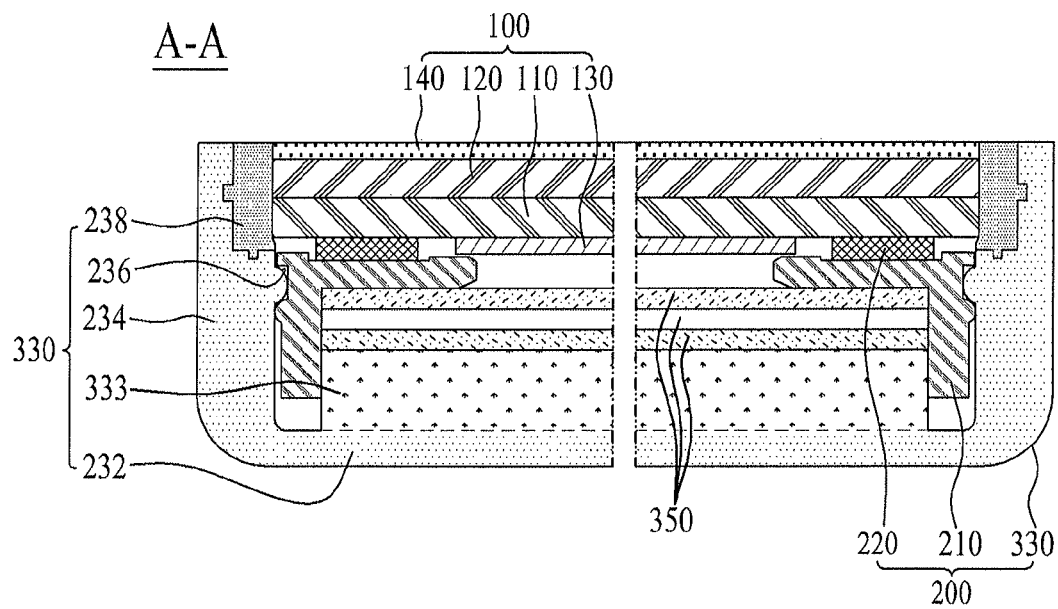
FIG. 7 is a sectional view illustrating a sectional surface taken along line A-A of FIG. 1, and is a view for describing a display device according to a second embodiment of the present invention.

FIG. 7 is a sectional view illustrating a sectional surface taken along line A-A of FIG. 1, and is a view for describing a display device according to a second embodiment of the present invention.

Referring to FIG. 7, a display device 20 according to the second embodiment includes a display panel 100, and a supporting member 200 that includes a set cover 330 closely surrounding a side of the display panel 100 and surrounds portions other than a top of the display panel 100, a light guide panel 333 integrated with the set cover 330, a light source (not shown) irradiating light on the light guide panel 333, and a plurality of optical sheets 350 that are disposed on the light guide panel 333 and enhance the luminance characteristic of light outputted from the light guide panel 333 to irradiate the light on the display panel 100. The display device 20 of the second embodiment having such a configuration has the same configuration as that of the display device 10 of the first embodiment, except that the display device 20 includes the set cover 330 integrated with the light guide panel 333, the light source which is disposed at at least one side of the light guide panel 333 integrated with the set cover 330, and the optical sheets 350 disposed on the light guide panel 333. Therefore, in a description on the display device 20 of the second embodiment, the description of the first embodiment is applied to the same configuration as that of the display device 10.

The set cover 330 includes a set plate 232, a set side wall 234, a second coupling part 236, a soft member 238, and a light guide panel 333. The set cover 330 having such a configuration is the same as that of the first embodiment, except that the soft member 238 is integrated with the set side wall 234 and simultaneously the light guide panel 333 is integrated with a bottom of the set plate 232 to face the display panel 100 in the double injection process or insert injection process.

The light guide plate 333 is separated from an inner surface of the set side wall 234 by a certain interval 333a and protrudes in a tetragonal shape to have a certain height from the set plate 232. A light incident portion facing the light source (not shown) is disposed at at least one side of the light guide panel 333. Therefore, the light guide panel 333 guides light, inputted through the light incident portion, to an upper portion. For this end, an optical pattern (not shown) that guides light, inputted from the light incident portion, to the upper portion may be formed at an upper surface of the light guide panel 333. Herein, the optical pattern may be an intaglio pattern or an embossed pattern.

The set plate 232 and set side wall 234 of the set cover 330 including the light guide panel 333 are formed of a metal material (for example, stainless or the like) or a white plastic material. However, the light guide plate 130 may be formed of a material different from that of the set plate 232, for example, be a resin formed of a material that contains a photocurable material hardened by ultraviolet (UV), a thermosetting material hardened by heat, and a heating coagulant that is naturally hardened by heating of the heating coagulant even without a separate hardening process.

Since the set cover 330 is formed to include the light guide panel 333 by an injection process, a reflective sheet included in the related art backlight unit may not be applied to the embodiment, but light traveling to a rear surface of the light guide panel 333 is lost by not using the reflective sheet. Therefore, in the embodiment, by forming the set plate 232 and set side wall 234 of the set cover 330 with a metal material (for example, stainless or the like) or a white plastic material, light traveling to the rear surface of the light guide panel 333 is reflected to the liquid crystal display panel 100, and thus, the loss of light due to removal of the reflective sheet can be minimized.

Figure 8:
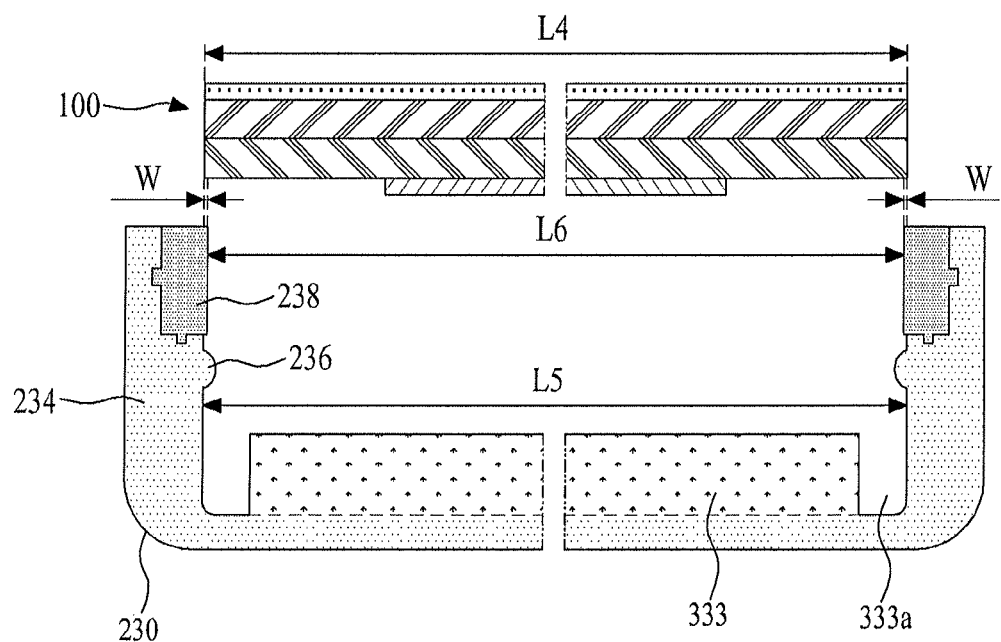
FIG. 8 is a view for describing a set cover which is integrated with a soft member and light guide panel of FIG. 7.

The soft member 238, as illustrated in FIG. 8, is formed to overlap with the display panel 100 by the certain width W, for closely surrounding the side of the display panel 100. For this end, the length L4 of the display panel 100 is formed identically to the distance L5 (corresponding to the length L4 of the display panel 100) between the set side walls 234, but the distance L6 between the soft members 238 is formed shorter by the certain width (W=L4−L6) than the length L4 of the display panel 100. Therefore, the display panel 100 and the soft member 238 overlap with each other by the certain width W. In other words, the side of the soft member 238 facing the side of the display panel 100 protrudes to the inside by the certain width W. In this case, the length L4 of the display panel 100 is the same as the distance L5 between the set side walls 234.

The optical sheets 350 are disposed on the light guide panel 333 integrated with the set cover 330 and enhance the luminance characteristic of light traveling from the light guide panel 333 to the display panel 100. For this end, the optical sheets 350 may include at least one diffusive sheet and at least one prism sheet, or include at least one composite sheet that simultaneously performs a diffusing function and a light collecting function.

The display device 20 of the second embodiment can provide the same effect as that of the display device 10 of the first embodiment, and moreover, the thickness of the display device 20 can be more reduced by integrating the light guide panel 333 and the set cover 330, and thus, the number of components can decrease.

The display device 10 of the first embodiment and the display device 20 of the second embodiment, as illustrated in FIG. 1, may be applied to televisions, but the embodiments are not limited thereto. As another example, the display device 10 of the first embodiment and the display device 20 of the second embodiment may be applied to notebook computers and portable information devices such as portable phones, smart phones, and tablet personal computers.

FIGS. 9A to 9G are views for sequentially describing a method of manufacturing a display device, according to a first embodiment of the present invention.

The method of manufacturing the display device 10, according to the first embodiment of the present invention, will be sequentially described below with reference to FIGS. 9A to 9G.

Figure 9A:
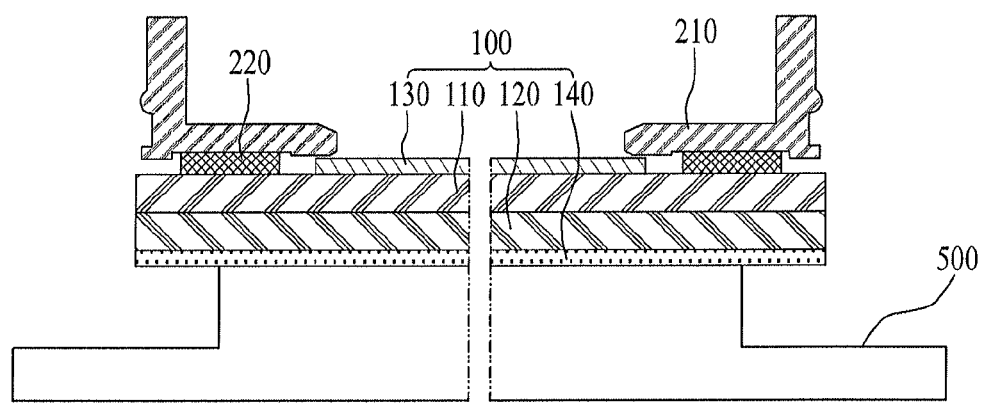
FIGS. 9A to 9G are views for sequentially describing a method of manufacturing a display device, according to a first embodiment of the present invention.

First, as illustrated in FIG. 9A, the top of the display panel 100 is disposed on a stage 500. That is, the display panel 100 is reversed, and then the upper polarizing film 140 of the display panel 100 is disposed on the stage 500.

Subsequently, the guide frame 210 is coupled to the bottom edge portion of the display panel 100 by the adhesive member 220, or the guide frame 210 with the adhesive member 220 formed therein is coupled to the bottom edge portion of the display panel 100. In this case, the adhesive member 220 may couple the lower substrate 110 of the display panel 100 and the guide frame 210, or couple the lower polarizing film 130 of the display panel 100 and the guide frame 210.

Figure 9B:
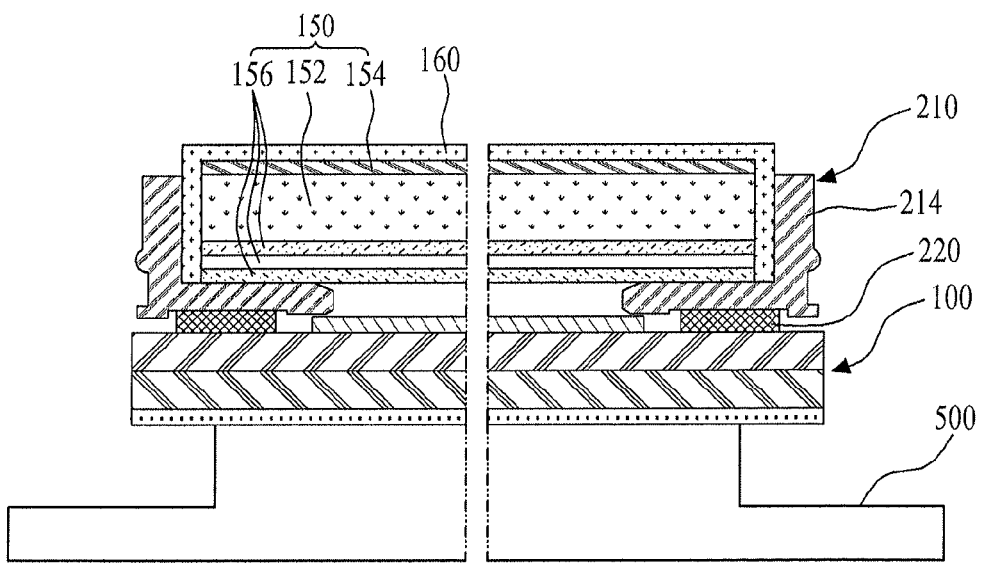

As illustrated in FIG. 9B, the backlight unit 150 is placed in the receiving space of the guide frame 210 that is prepared by the guide side wall 214 of the guide frame 210. Subsequently, the supporting case 160 for supporting the backlight unit 150 is placed in the receiving space of the guide frame 210.

The supporting case 160 may not be applied according to the product design structure of the display device 10. Also, a process of assembling the backlight unit 150 and the supporting case 160 is not performed when the display panel 100 is an organic light emitting display panel including a plurality of organic light emitting elements.

Subsequently, as illustrated in FIGS. 9C to 9G, the set cover 230 including the receiving space and soft member 238 is reversed, and then, by coupling the second coupling part 236 of the reversed set cover 230 to the first coupling part 216 of the guide frame 210, the guide frame 210 is placed in the receiving space of the set cover 230, and the set cover 230 surrounds portions other than the top of the display panel 100. A detailed description on this will be made below.

Figure 9C:
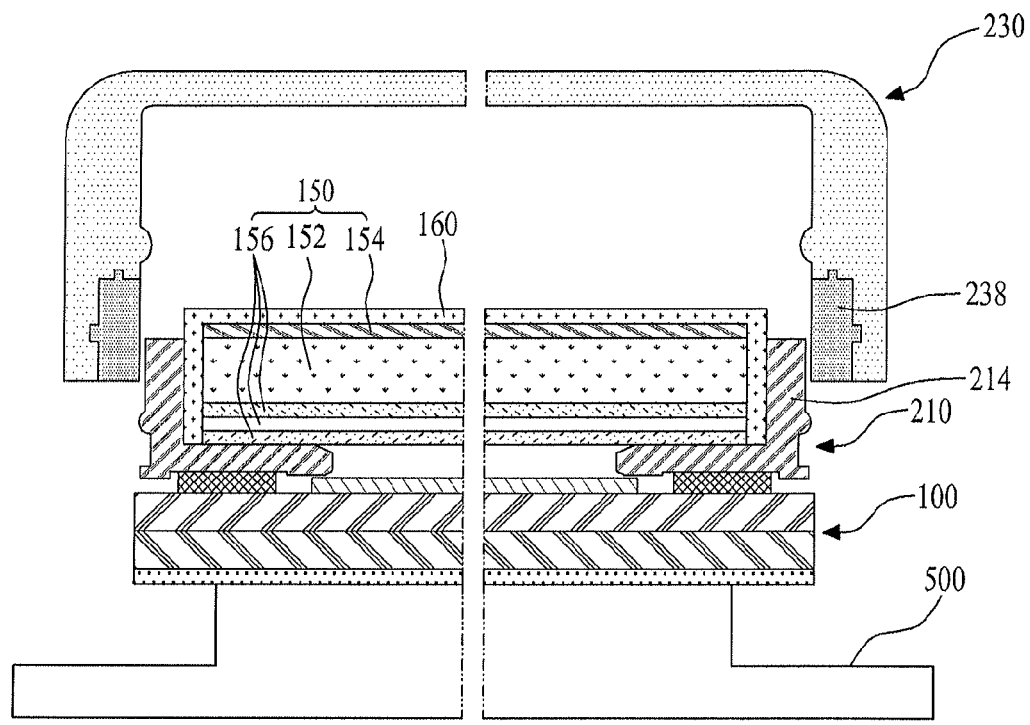

First, as illustrated in FIG. 9C, the positions of the reversed set cover 230 and guide frame 210 are aligned.

Figure 9D:
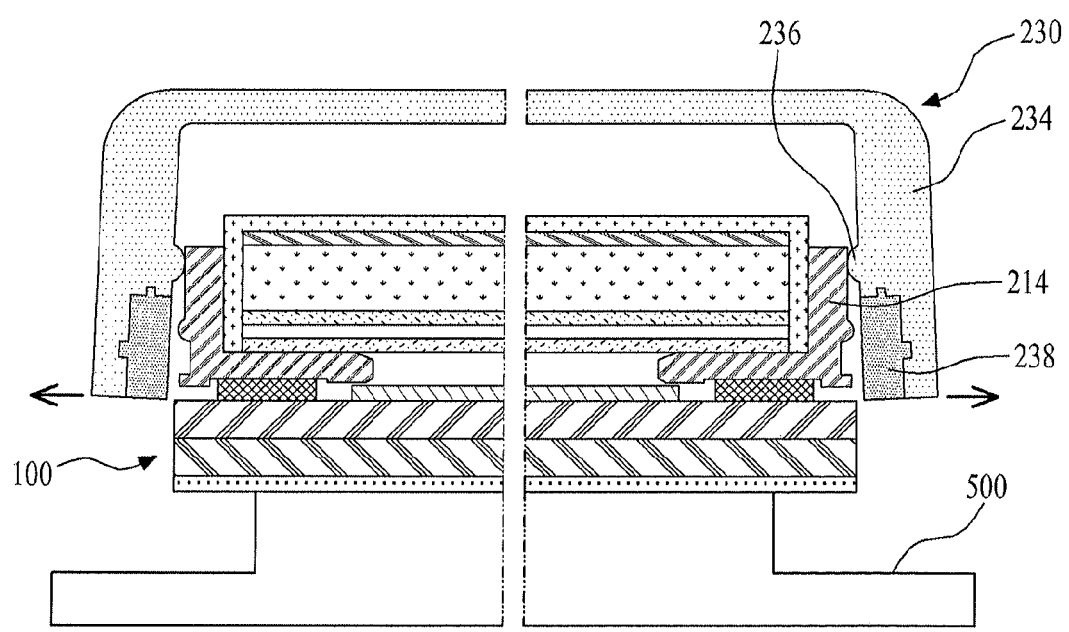
Figure 9E:
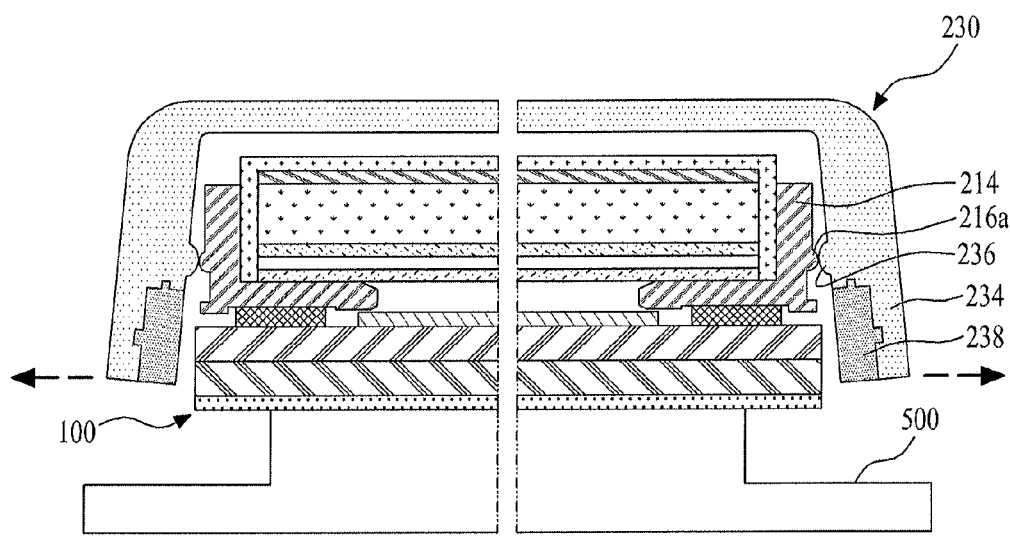
Figure 9F:
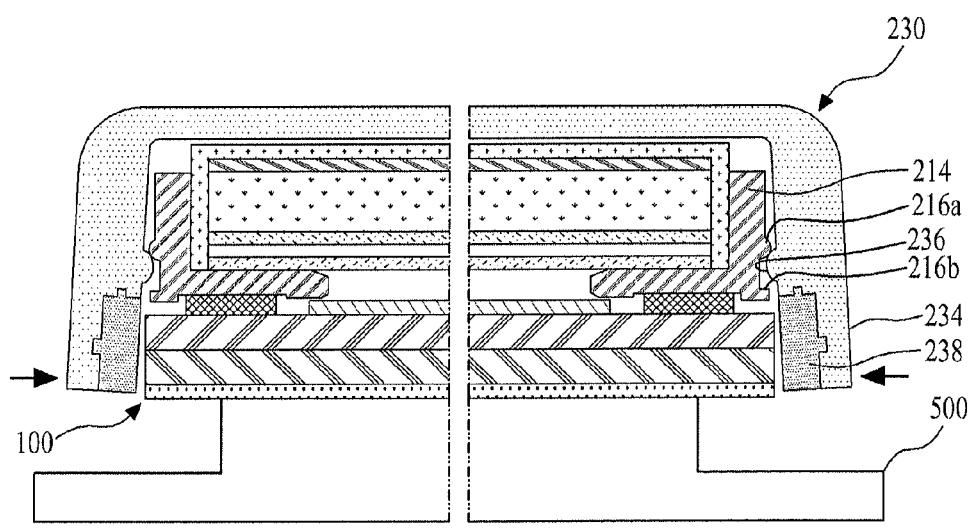
Figure 9G:
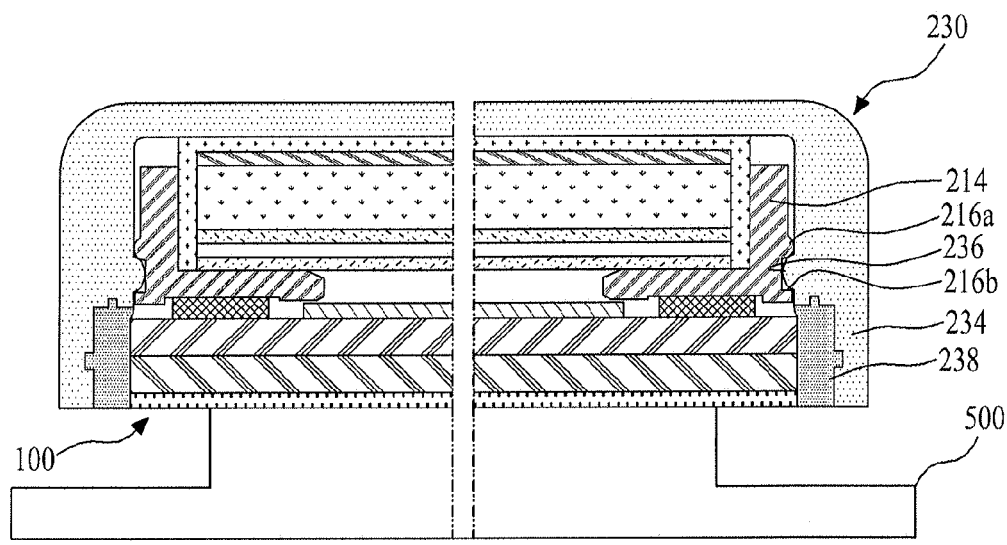

Subsequently, as illustrated in FIGS. 9D to 9G, the reversed set cover 230 descends until the second coupling part 236 of the set cover 230 is coupled to the first coupling part 216 of the guide frame 210. Therefore, as illustrated in FIG. 9D, as the second coupling part 236 of the set cover 230 contacts the guide side wall 214 of the guide frame 210 by descending of the set cover 230, the set side wall 234 is bent in an outer direction by the height (or thickness) (→) of the second coupling part 236. Subsequently, when the reversed set cover 230 descends further, as illustrated in FIG. 9E, as the second coupling part 236 of the set cover 230 contacts the protruding portion 216a that is formed at the first coupling part 216 of the guide frame 210, the set side wall 234 is further bent in the outer direction by the sum (--→) of the height (or thickness) of the second coupling part 236 and the height of the protruding portion 216a. Thus, the soft member 230 which is integrated with the set side wall 234 to overlap with the display panel 100 faces the side of the display panel 100 by bending of the set side wall 234. Afterward, when the reversed set cover 230 descends further, as illustrated in FIG. 9F, the bending of the set side wall 234 that has been made by the protruding portion 234 formed at the first coupling part 216 of the guide frame 210 is removed, and thus, the second coupling part 236 is bent (←) by the elastic force of the set side wall 234 in an inner direction along a boundary surface between the protruding portion 216a and the groove portion 216b, and inserted into the groove portion 216b. Accordingly, as illustrated in FIG. 9G, as the second coupling part 236 is inserted into and coupled to the groove portion 216b of the first coupling part 216, the set cover 230 is coupled to the guide frame 210, and the soft member 238 is pressed against the side of the display panel 100 by the elastic force of the set side wall 234 to closely surround the side of the display panel 234, thereby forming the side frame of the display panel 100.

The manufacturing method of the display device 10 according to the first embodiment enables easy coupling of the set cover 230 and guide frame 210 with the elasticity of the set side wall 234 that is generated by contact of the first coupling part 216 (which is formed at the guide frame 210) and the second coupling part 236 that is formed at the set side wall 234 of the set cover 230, and thus facilitates assembly of the display device 10, thereby enhancing productivity. Also, in the manufacturing method of the display device 10 according to the first embodiment, by closely adhering the soft member 238 (which is integrated with the set side wall 234) to the side of the display panel 100 with elasticity of the set side wall 234 to overlap with the display panel 100, a front case and a front set cover are removed from general display products, and thus, foreign substances are prevented from being penetrated through a gap that is formed at the side of the display panel 100, thereby preventing the aesthetic design effect from being degraded by the gap.

FIGS. 10A to 10E are views for sequentially describing a method of manufacturing a display device, according to a second embodiment of the present invention.

The method of manufacturing the display device 20, according to the first embodiment of the present invention, will be sequentially described below with reference to FIGS. 10A to 10E.

Figure 10A:
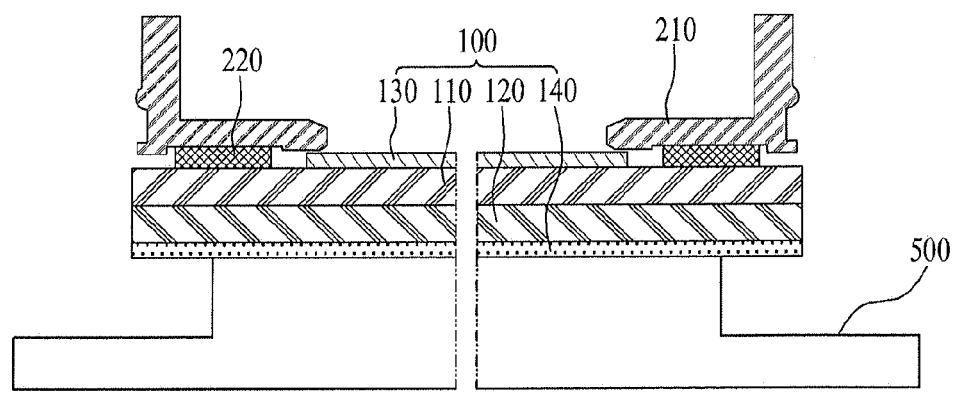
FIGS. 10A to 10E are views for sequentially describing a method of manufacturing a display device, according to a second embodiment of the present invention.

First, as illustrated in FIG. 10A, the top of the display panel 100 is disposed on a stage 500. That is, the display panel 100 is reversed, and then the upper polarizing film 140 of the display panel 100 is disposed on the stage 500.

Subsequently, the guide frame 210 is coupled to the bottom edge portion of the display panel 100 by the adhesive member 220, or the guide frame 210 with the adhesive member 220 formed therein is coupled to the bottom edge portion of the display panel 100. In this case, the adhesive member 220 may couple the lower substrate 110 of the display panel 100 and the guide frame 210, or couple the lower polarizing film 130 of the display panel 100 and the guide frame 210.

Figure 10B:
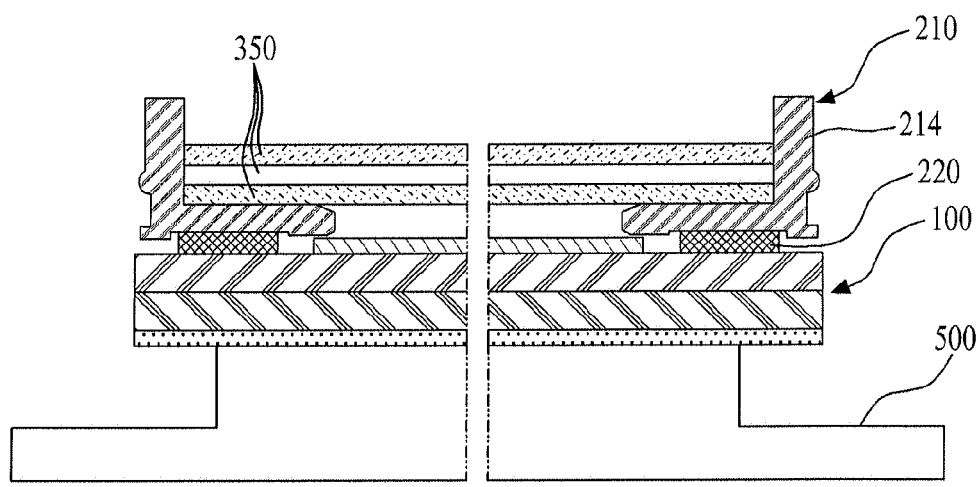

As illustrated in FIG. 10B, the optical sheets 350 are sequentially disposed in the receiving space of the guide frame 210 that is prepared by the guide side wall 214 of the guide frame 210.

Figure 10C:
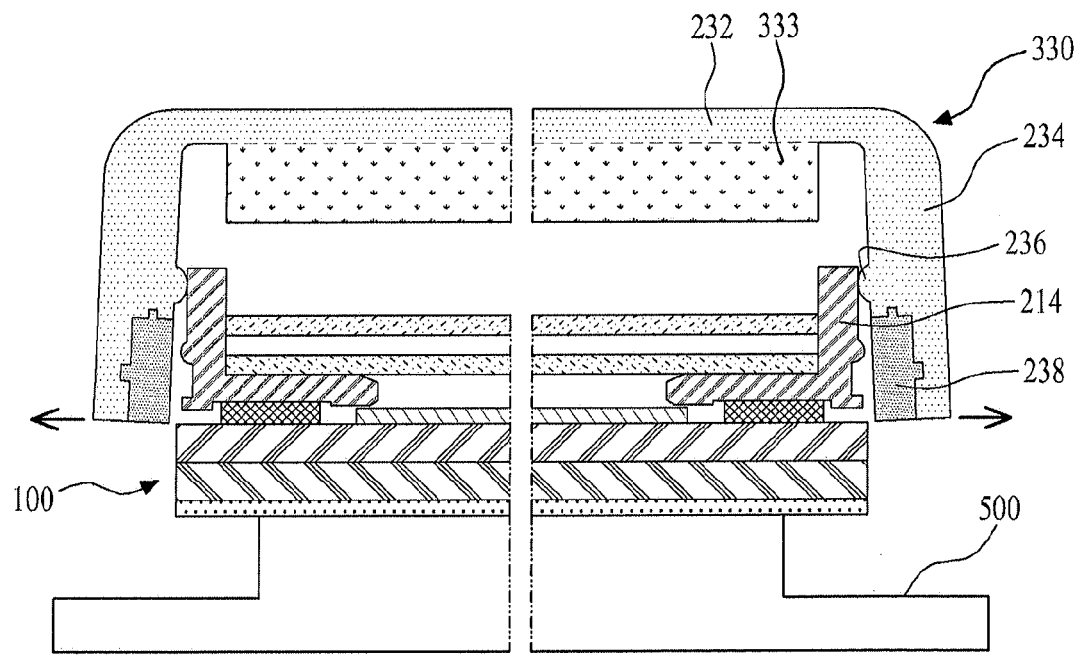
Figure 10D:
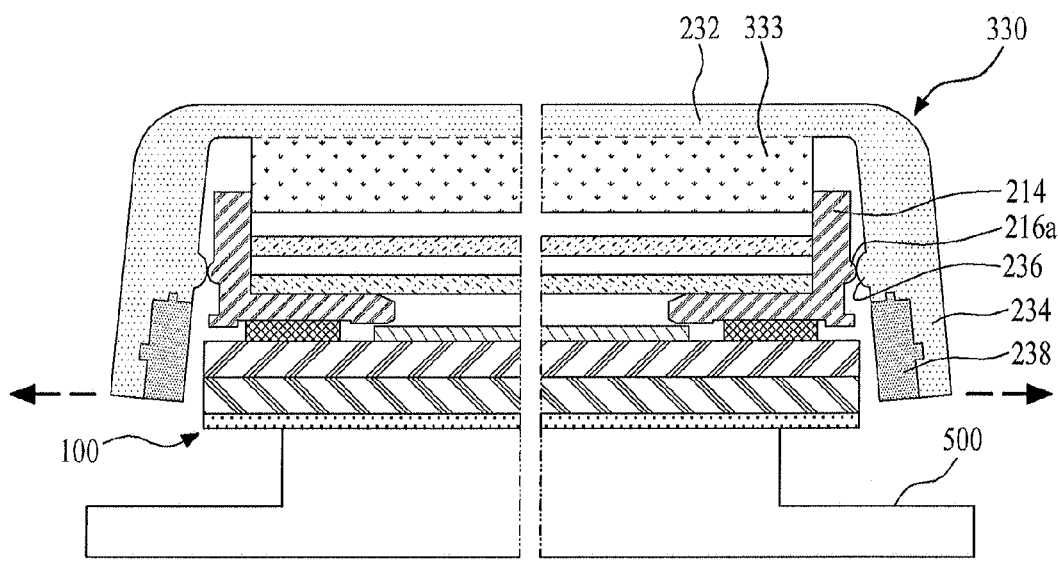
Figure 10E:
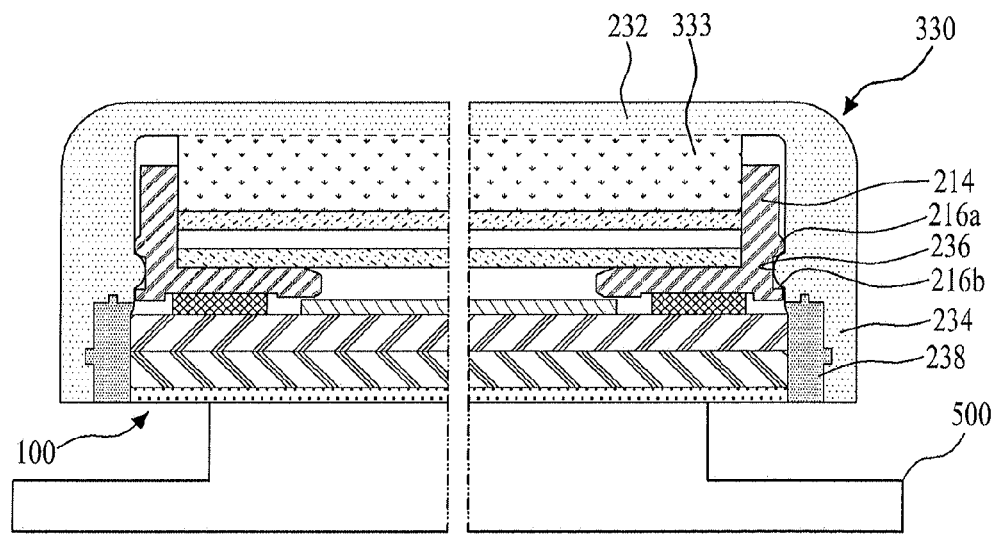

Subsequently, as illustrated in FIGS. 10C to 10E, the set cover 230 including the receiving space and the integrated soft member 238 and light guide panel 333 is reversed, and then, by coupling the second coupling part 236 of the reversed set cover 230 to the first coupling part 216 of the guide frame 210, the guide frame 210 is placed in the receiving space of the set cover 230, and the set cover 230 surrounds portions other than the top of the display panel 100. A detailed description on this will be made below.

First, as illustrated in FIG. 10C, the positions of the reversed set cover 230 and guide frame 210 are aligned, and then the reversed set cover 230 descends until the second coupling part 236 of the set cover 330 is coupled to the first coupling part 216 of the guide frame 210. Therefore, as the second coupling part 236 of the set cover 330 contacts the guide side wall 214 of the guide frame 210 by descending of the set cover 330, the set side wall 234 is bent in an outer direction by the height (or thickness) (→) of the second coupling part 236. Subsequently, when the reversed set cover 330 descends further, as illustrated in FIG. 10D, as the second coupling part 236 of the set cover 330 contacts the protruding portion 216a that is formed at the first coupling part 216 of the guide frame 210, the set side wall 234 is further bent in the outer direction by the sum (--→) of the height (or thickness) of the second coupling part 236 and the height of the protruding portion 216a. Thus, the soft member 230 which is integrated with the set side wall 234 to overlap with the display panel 100 faces the side of the display panel 100 by bending of the set side wall 234. Afterward, when the reversed set cover 330 descends further, the bending of the set side wall 234 that has been made by the protruding portion 234 formed at the first coupling part 216 of the guide frame 210 is removed, and thus, the second coupling part 236 is bent (←) by the elastic force of the set side wall 234 in an inner direction along a boundary surface between the protruding portion 216a and the groove portion 216b, and inserted into the groove portion 216b. Accordingly, as illustrated in FIG. 10E, as the second coupling part 236 is inserted into and coupled to the groove portion 216b of the first coupling part 216, the set cover 330 is coupled to the guide frame 210, and the soft member 238 is pressed against the side of the display panel 100 by the elastic force of the set side wall 234 to closely surround the side of the display panel 234, thereby forming the side frame of the display panel 100.

The manufacturing method of the display device 20 according to the second embodiment can provide the same effect as that of the manufacturing method of the display device 10 according to the first embodiment, and moreover, the thickness of the display device 20 can be more reduced by integrating the light guide panel 333 and the set cover 330, and thus, the number of components can decrease.

According to the embodiments, the set cover surrounds portions other than the top of the display panel, and thus, a front case and a front set cover are not applied to general display products. Accordingly, the thicknesses of display devices can be reduced, and a sense of beauty can be enhanced by the innovative design.

Moreover, by adhering the side of the display panel to the soft member that is integrated with the set side wall of the set cover to overlap with the display panel by a certain width, a front case and a front set cover are removed from general display products, and thus, foreign substances are prevented from being penetrated through the gap that is formed at the side of the display panel, thereby preventing the aesthetic design effect from being degraded by the gap.

Moreover, the thickness of the display device can be more reduced by integrating the light guide panel and the set cover, and thus, the number of components can decrease.

Moreover, the set cover and the guide frame are easily coupled by elasticity of the set side wall due to contact of the first coupling member (which is formed at the guide frame) and the second coupling member that is formed at the set side wall of the set cover, and thus, the display device can be easily assembled, thereby enhancing productivity.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A display device comprising:
   a display panel;
   a guide frame supporting a bottom edge portion of the display panel, wherein the guide frame comprises a panel supporting part to face the bottom edge portion of the display panel, a guide side wall bent from the panel supporting part, and a groove portion formed concavely from the guide side wall;
   an adhesive member formed at the panel supporting part, coupling the display panel and the guide frame;
   a set cover receiving the guide frame, and surrounding a side of the display panel, wherein the set cover comprises a set plate and a set side wall which prepare a receiving space for receiving the guide frame; and
   a soft member integrated with the set side wall of the set cover and to face the side of the display panel, and directly contacting the side of the display panel,
   wherein a length of the display panel is formed longer by a certain width than a distance between the soft members,
   wherein the set side wall comprises an upper wall integrated with a side surface of the soft member, and a lower wall integrated with a lower surface of the soft member, the upper wall having thickness smaller than a thickness of the lower wall, the guide frame being disposed below the upper wall,
   wherein the set cover further comprises a coupling protrusion protruding in a direction from an inner wall of the lower wall to the guide side wall, and inserted into the groove portion by an elastic force of the set side wall, and
   wherein the guide frame and the coupling protrusion are disposed below the bottom edge portion of the display panel.

2. The display device of claim 1, wherein the guide frame further comprises
   a protruding portion protruding from the guide side wall to be adjacent to the groove portion.

3. The display device of claim 1, further comprising a backlight unit placed in the receiving space, and irradiating light on the display panel.

4. The display device of claim 3, further comprising a supporting case placed in the receiving space, and receiving the backlight unit and supporting the guide frame.

5. The display device of claim 1, wherein the set cover further comprises a light guide panel directly integrated with a bottom of the set plate.

6. The display device of claim 5, further comprising:
   a light source disposed to face at least one side of the light guide panel, and irradiating light on the light guide panel; and
   a plurality of optical sheets disposed on the light guide panel, and enhancing luminance characteristic of light, outputted from the light guide panel, to irradiated the light on the display panel.

7. The display device of claim 1, wherein a length of the display panel is same as a distance between the lower walls of the set side wall.

8. The display device of claim 1, wherein the soft member is in contact with a side surface of the upper wall and a top surface of the lower wall of the set side wall.

* * * * *